United States Patent [19]
Sugiura et al.

[11] Patent Number: 4,790,516
[45] Date of Patent: Dec. 13, 1988

[54] REACTOR FOR IRON MAKING

[75] Inventors: Saburo Sugiura, Aichi; Masanobu Ikeda, Mie; Noboru Demukai, Gifu, all of Japan

[73] Assignee: Daido Tokushuko Kabushiki Kaisha, Aichi, Japan

[21] Appl. No.: 865,301

[22] Filed: May 21, 1986

Related U.S. Application Data

[62] Division of Ser. No. 445,534, Nov. 30, 1982, Pat. No. 4,605,437.

[30] Foreign Application Priority Data

Feb. 1, 1982 [JP] Japan .................................. 57-14443

[51] Int. Cl.⁴ ............................................. F27B 3/22
[52] U.S. Cl. .................................. 266/144; 266/215; 266/218; 266/900
[58] Field of Search ............... 75/43, 44 R, 445, 59.18; 266/900, 901, 200, 215, 218

[56] References Cited

U.S. PATENT DOCUMENTS 3,424,573 1/1969 De Villiers .......................... 266/901
4,140,480 2/1979 Kaiser et al. ......................... 266/900

FOREIGN PATENT DOCUMENTS 390157 11/1973 U.S.S.R. ............................. 266/900

Primary Examiner—Melvyn J. Andrews
Attorney, Agent, or Firm—Armstrong, Nikaido, Marmelstein & Kubovcik

[57] ABSTRACT

A reactor for iron making having an upper gas blowing nozzle, a lower gas blowing nozzle, and an iron scrap charging inlet. A vertical shaft is installed directly above the inlet at the top part of the reactor. A mechanism is provided in the lower end of the vertical shaft for controlling charging of the iron scrap to the reactor. A by-pass tube is connected between the top part of the reactor and a gas inlet in the vertical shaft directly above the mechanism for controlling the charging of iron scrap and permits exit of high temperature exhaust gases from the reactor and introduces the exhaust gases to flow through the iron scrap in the vertical shaft to pre-heat the same. Structure is provided in the by-pass tube for introducing oxygen gas or air into the high temperature exhaust gases to react therewith and generate further heat. The structure can comprise a nozzle. The mechanism for controlling charging of iron scrap can include a damper positioned immediately above the inlet in the top part of the reactor which is movable to open and close the vertical shaft together with a stopper positioned above the damper and movable to open and close the vertical shaft. Certain amounts of iron scrap can thereby be charged to the reactor by sequential openings and closings of the damper and the stopper.

3 Claims, 11 Drawing Sheets

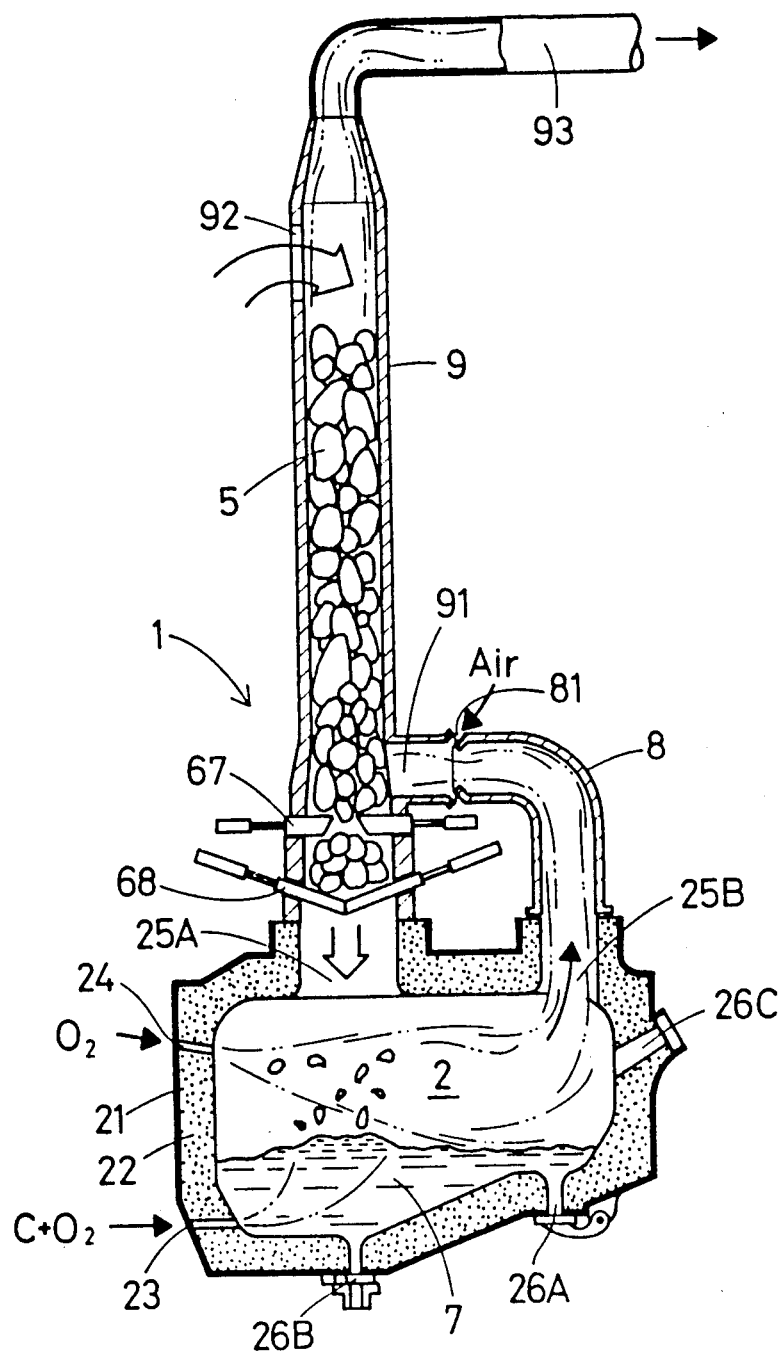

4,790,516

REACTOR FOR IRON MAKING

This is a division of application Ser. No. 445,534, filed Nov. 30, 1982, now U.S. Pat. No. 4,605,437.

BACKDGROUND OF THE INVENTION

1. Field of the Invention

The present invention relates to a method of making iron (including pig iron and steels) by melting iron scrap without consuming electric power or petroleum. The invention encompasses an apparatus suitable for practicing the method.

2. State of the Art

Melting of iron scrap for producing steels, particularly special steels, is usually carried out in electric furnaces. It is assumed that there is little probability of improvement in the generation of electric power, and that the power cost will successively increase. Also, the relationship between petroleum-supply and demand is getting tighter, and therefore, it is not advantageous to generate thermal electric power with consumption of petroleum, or even to directly use petroleum fraction for steelmaking.

We have intended to establish a technology of iron making using coal or coke, a stable supply of which can be expected for the present, or other carbonaceous materials of lower grades, instead of using electricity or petroleum.

With respect to the iron making using carbonaceous materials, cupola iron making using coke has been commercially practiced. The cupola iron making requires lumps or blocks of coke of a high strength and suitable sizes so that the coke may support the charged materials to ensure gas flow in the furnace. This poses a limit from a materials viewpoint, and a disadvantage in cost. Also, a cupola is inherently a furnace for making cast iron and gives only molten iron containing 3 to 4% carbon, namely, pig iron. Therefore, if it is intended to make steels, further oxidation refining (decarburization) and reduction refining using another furnace such as a converter are necessary.

SUMMARY OF THE INVENTION

An object of the present invention is to provide a method of iron making which does not use the carbonaceous materials for supporting the charged materials, but instead employs charging the carbonaceous material directly into the molten iron together with iron scrap and provides space for burning CO gas over the molten iron, thus enabling use of any carbonaceous material regardless of shape and size thereof.

Another object of the present invention is to provide apparatus for practicing the present method of iron making.

Because the shape of the vessel in which the present iron making is carried out is a kind of reactor for chemical processes, we named our technology "reactor iron making".

According to our method of reactor iron making, it is possible to realize not only simultaneous melting and oxidation-refining of iron, but also refining of the molten iron and controlling carbon content in the range up to 3.5%. Thus, for the purpose of steel making, the technology offers a rational and advantageous process.

DRAWINGS

FIG. 1 and FIG. 2 illustrate operation of the present iron making apparatus: FIG. 1 showing a longitudinal section of a reactor, FIG. 2 showing a cross section of the reactor and longitudinal section of a shaft.

FIGS. 3A through 3G are graphs showing data of one complete operational cycle according to the present method of iron making: 3A being change in weight of the molten pig iron during one cycle of the operation, 3B being rate of charging coal (the solid line shows the cumulative amount, and the broken line shows the added amount), 3C being flow rate of oxygen gas, 3D being rate of charging iron scrap, 3E being carbon content in the molten pig iron, 3F being $CO_2/(CO+CO_2)$ ratio in exhaust gas, and 3G being temperature of the molten pig iron.

FIG. 4 is a longitudinal section of another embodiment of the present apparatus for reactor iron making to illustrate operation thereof.

FIG. 7 showing a longitudinal section and FIG. 8 showing a cross section in I—I direction of FIG. 7.

DETAILED DESCRIPTION OF PREFERRED EMBODIMENTS

The present method of reactor iron making is characterized by charging iron scrap and carbonaceous material into molten iron which is placed in a reactor with space over the molten iron, blowing oxygen gas into the molten iron so as to stir the molten iron and oxidize the carbonaceous material mainly to CO, blowing oxygen also into the space ov er the molten iron in the reactor so as to oxidize the whole or a portion of the CO gas to $CO_2$, heating the charged iron scrap to melt with heat generated through the oxidation, and utilize the high temperature gas obtained by burning the rest of the CO gas outside the reactor for preheating the iron scrap to be charged.

The present apparatus suitable for practicing the above method of iron making essentially comprises a reactor with refractory lining and having each at least one upper and lower gas blowing nozzle, a gas exhaust and a tapping nozzle; and a vertical shaft installed separately to the reactor but connected to the gas exhaust, which is an inlet of iron scrap to be charged and for heat exchange between the high temperature exhaust gas and the iron scrap.

Typical embodiments of the reactor iron making according to the present invention will now be illustrated.

Figure 1:
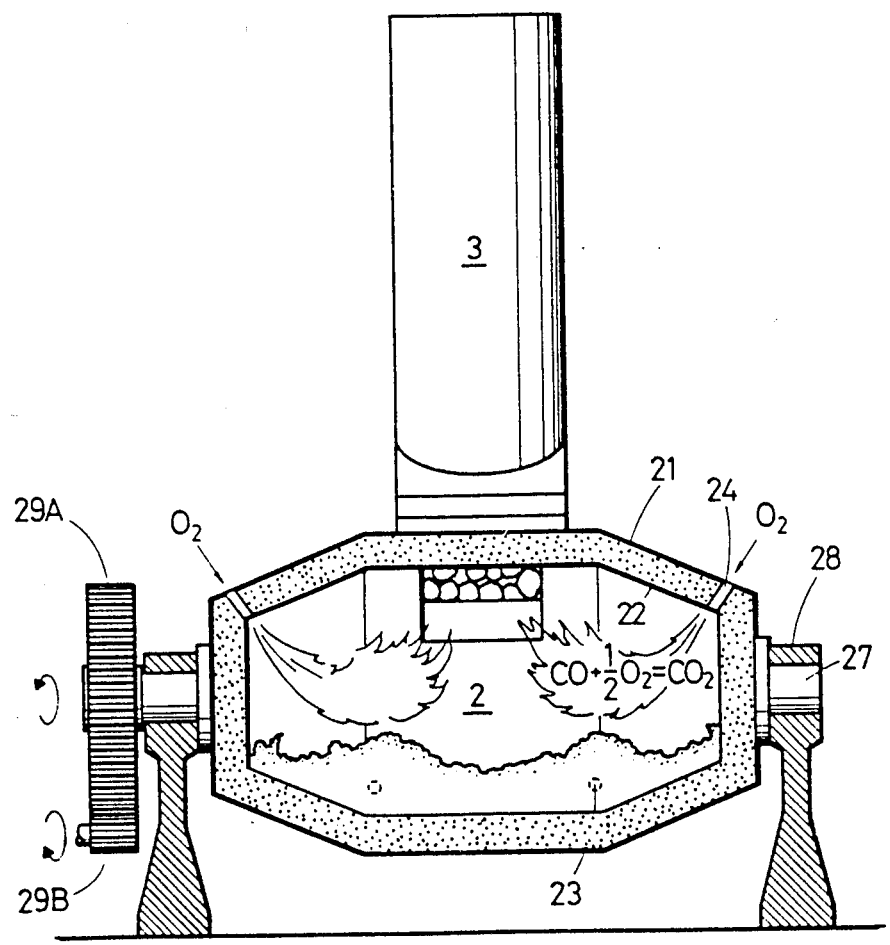
Figure 2:
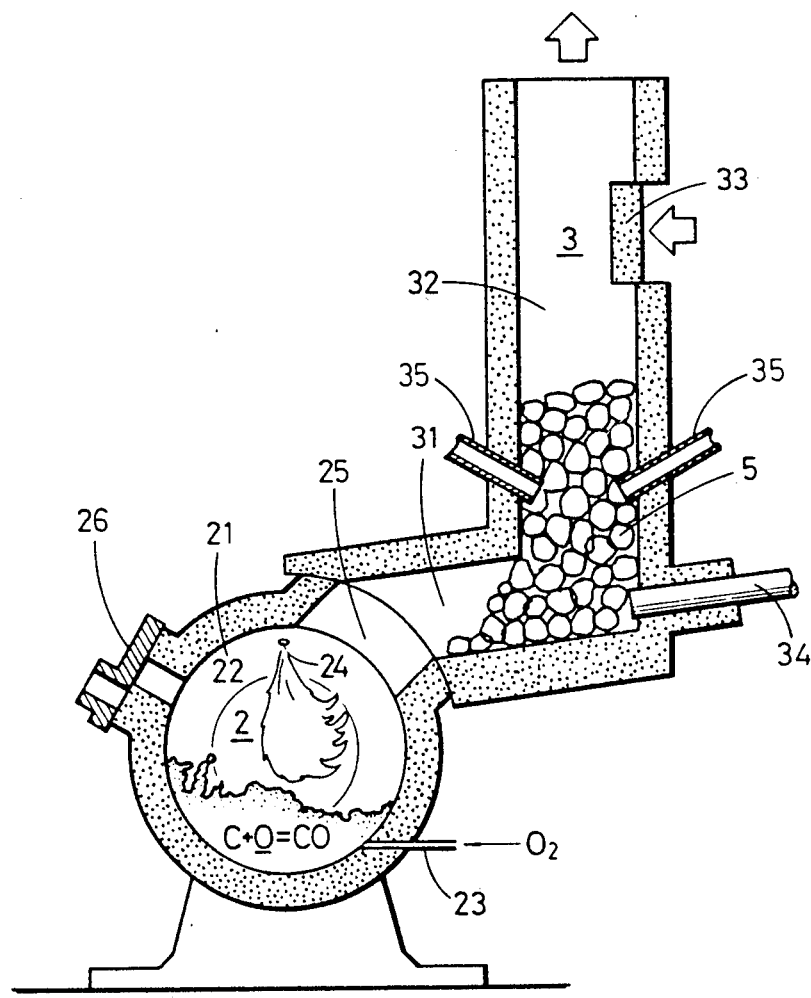
Figure 3:
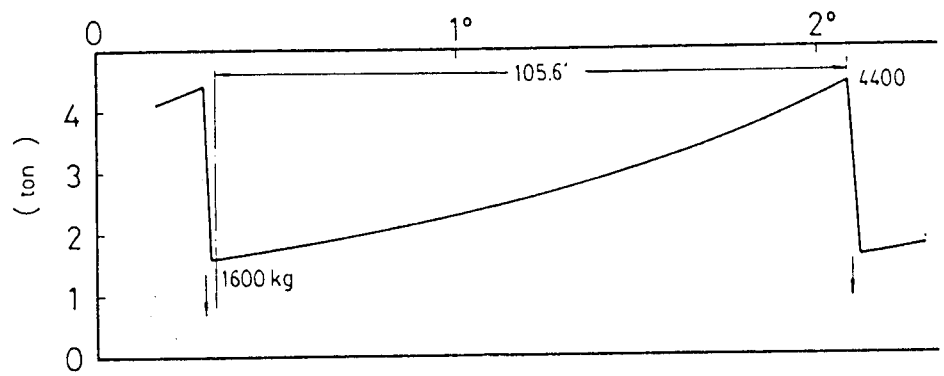
Figure 3:
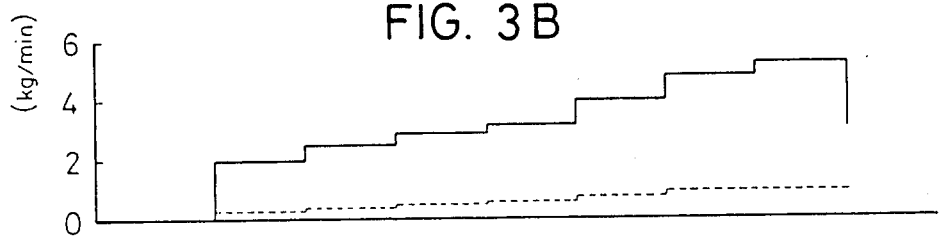
Figure 3:
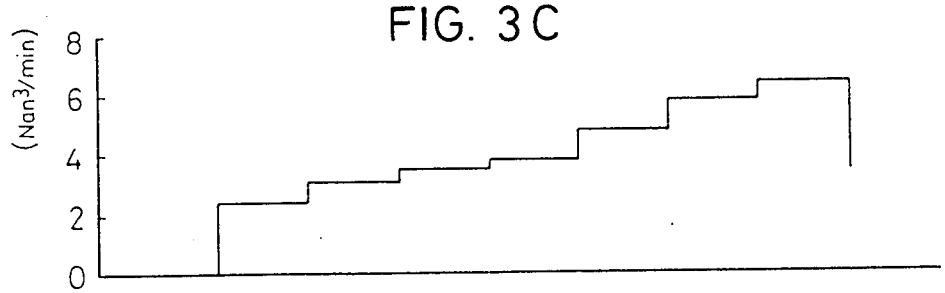
Figure 3D:
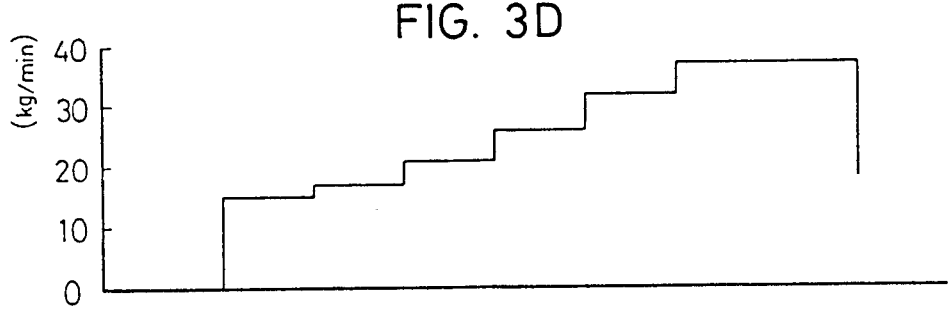
Figure 3E:
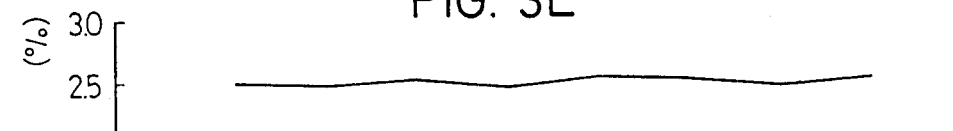
Figure 3F:
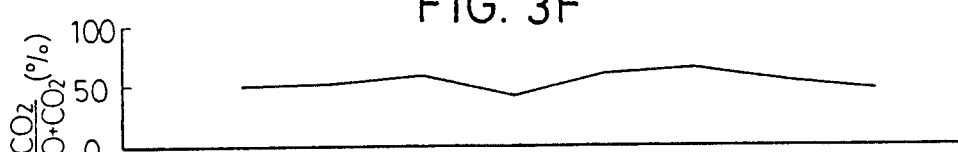
Figure 3G:
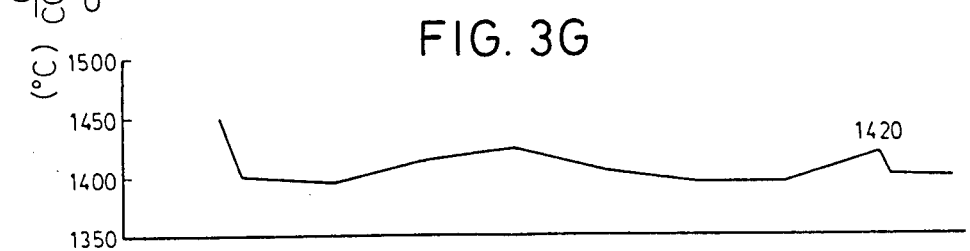

As shown in FIG. 1 and FIG. 2, an example of the present apparatus for reactor iron making comprises a horizontally installed cylindrical reactor 2 made of steel shell with refractory lining.

The reactor 2 is held at spindles 27 of both sides by journals 28, and rotatable in a certain angle range around a horizontal axis by driving force of a motor (not shown) transmitted through gear 29A and pinion 29B. As noted above, reactor 2 has nozzles 23 for blowing oxygen gas into the molten iron at the lower part thereof and nozzles 24 for blowing oxygen gas into the space over the molten iron at the upper part thereof. It has also a sliding nozzle 26 for tapping the molten iron and charging slag-forming agents. Gas exit 25 connects to lateral part 31 of shaft 3 in a suitable rotational angle range.

Shaft 3 is cylindrical, and standing part 32 thereof has an entrance 33 for the materials including iron scrap. The lateral part 31 is inclined in a suitable angle so that the introduced iron scrap 5 (in some cases, with coal) remain piled at a certain angle but a desired amount of iron scrap may be charged into the reactor when conveyed by a feeding means such as pusher 34. The feeding means may be a screw conveyor.

It is preferable to provide a nozzle 35 for blowing oxygen gas or air at the lower part of the shaft where heat exchange between the high temperature exhaust gas and the scrap to be charged. This enables substantially complete burning of CO in the exhaust gas resulting in more efficient preheating of the iron scrap, and facilitating treatment of the exhaust gas. The top of the shaft is connected to an exhaust gas treating device (not shown) such as a dust remover.

At the beginning of operation, a certain amount of molten pig iron or steel is prepared in another device such as blast furnace or an arc furnace, and placed in reactor 2 as the seed. Alternatively, in the case where the reactor is constantly used and inside thereof is kept at a high temperature, operation can be begun without using the seed molten iron if easily oxidizable iron scrap such as lathe chip is placed in the reactor. Then, iron scrap 5 and the carbonaceous material such as coal are thrown into molten iron 7, and oxygen gas is blown from the upper and lower nozzles 23 and 24. As noted above, oxidation of the charged carbonaceous material to CO occurs in molten iron 7, and major part of the resulting CO is oxidized to $CO_2$ in the space over the molten iron. Due to the heat generated through the oxidation, charge iron scrap melts, and at the same time, carburization to the molten iron occurs. The carburization proceeds very rapidly because of forced stirring by blowing.

As readily understood, the heat generated due to the oxidation of carbon to CO in the molten iron is almost completely utilized for temperature increase of the molten iron, and the heat generated due to the oxidation of CO to $CO_2$ is also highly absorbed by the molten iron through free surface thereof increased by the forced stirring.

The carbonaceous material may be, although our attention is directed mainly to coal as noted before, of lower grades such as graphite powder, retort carbon or chimney soot. Even if coal is used, lower coking coal can be used.

In case where the carbonaceous material can be obtained in the form of lumps or blocks, it may be mixed with the iron scrap and charged through shaft 3. On the other hand, if it is in the form of powder or fine particles, a considerable amount thereof will be blown away during the heat exchange step by the exhaust gas, and therefore, it should be injected into the molten iron through a nozzle (not shown in the Figures) provided in the reactor with a stream of nitrogen gas (if out of the explosive composition range, air could be used). This is a preferable embodiment because the powder carbonaceous material reacts rapidly.

The amount (or rate) of oxygen to be blown in and the amount (or rate) of the carbonaceous material to be charged depend on conditions of the operation cycle or, more specifically, is determined by taking into account the amount and temperature of the seed molten iron, the heat necessary for melting the iron scrap, and heat radiated outside the reactor and taken out by the exhaust gas (with consideration on the heat recovery during the heat exchange with the iron scrap). The iron scrap of the amount balancing with the generated heat is charged, and after completion of melting of the iron scrap, further charging and blowing are continued to increase the molten iron. Charging of the materials may be, not only in this continual or intermittent manner, but also in continuous manner as long as the operation can be controlled.

When the amount of the molten iron reaches the limit of capacity of the reactor, the reactor is tilted and the sliding nozzle is opened to tap the molten iron into a ladle. For the purpose of efficient operation, it has been experienced that the amount of the molten iron in the reactor should be at highest 40% of inner volume of the reactor, in other words, 60% or more should be left as the space over the molten iron.

Further steps of converting the molten iron (particularly pig iron) obtained by the present method to steel such as, decarburization, deoxidation, desulfurization and addition of alloying elements may be carried out as usual in separate refining process. However, at least a part of the refining may be performed in the reactor with slag of a suitable composition formed on the molten iron. As described above, the molten iron is vigorously stirred due to the blowing of oxygen gas, and therefore, refining proceeds very effectively.

After tapping of the molten iron from the reactor, the above described steps are repeated using a suitable amount of the seed molten iron remaining in the reactor. It is preferable to have the amount of the seed molten iron retained in the reactor, though depending on the capacity of the reactor and the operation conditions, to be in the range of 5 to 80% of the maximum amount of molten iron.

In order to ensure smooth operation of the above described apparatus for reactor iron making, it is necessary to use iron scrap of relatively uniform shape and size. If such material is difficult to obtain, it is recommended to use the apparatus described hereafter. The apparatus enables smooth operation free from the restriction by shape and size of the iron scrap.

One such apparatus has the structure as shown in FIG. 4.

The apparatus essentially comprises a reactor with refractory lining and having each at least one upper and lower gas blowing nozzle, an iron scrap charging inlet which is at the same time a high temperature gas exit; and a vertical shaft installed directly over the iron scrap charging inlet and connected therewith, and having means for controlling charging the iron scrap at the lower end of the shaft and a gas inlet thereabove for introducing the exhaust gas from the high temperature gas exit of the reactor by way of a by-pass tube, which shaft is an inlet of iron scrap to be charged and for heat exchange between the high temperature exhaust gas and the iron scrap.

Reactor 2 may be provided with, if necessary, another nozzle (not shown) for injecting powdery carbonaceous material with stream of a suitable carrier gas. The carbonaceous material may be, of course, charged as a mixture with the iron scrap.

Tapping of the molten iron may be carried out through the seed iron inlet 26C by tilting the reactor. However, it is preferable to use tapping nozzle 26A, because it may be desired not to interrupt the iron making by the tapping, and heat loss will be diminished.

The position of the tapping nozzle 26A should be such that a suitable amount of the molten iron will remain as the seed in the reactor. Reference 26B indicates discharging nozzle for the seed molten iron.

The means for controlling charging the iron scrap installed at the lower part of the shaft comprises a stopper 67 and a damper 68 which laterally advance and retract to close and open the shaft. At the stage where stopper 67 is opened and damper 68 is closed, iron scrap 5 is charged through iron scrap inlet 92 at the upper part of the shaft, and then, stopper 67 is closed to hold a certain amount of the iron scrap on damper 68. When damper 68 is opened, the iron scrap falls through charging inlet 25A into the molten iron. Then, damper 68 is closed and stopper 67 is opened, the entire amount of scrap comes down, stopper 67 is closed, a certain amount of iron scrap will be held on damper 68, which stands by for the subsequent charging.

Operation of this apparatus will be understood from the above explanation. The iron scrap 5 introduced through iron scrap entrance 92 down in shaft 9 comes to the lower end of the shaft, and falls down into reactor 2, where it is melted by being heated with the heat generated by the reaction of the carbonaceous material injected (or charged with the iron scrap) into the reactor and oxygen. High temperature exhaust gas containing CO comes from exit 25B by way of by-pass tube 8 into the shaft through gas inlet 91 at the lower part of the shaft. The gas is mixed with air introduced through a nozzle or a clearance provided in the by-pass tube, and reacts to generate heat, and ascends in the shaft where it heats the iron scrap and is cooled. The resulting low temperature gas comes out of low temperature gas exit 93 and treated in an exhaust gas treatment device (not shown) to be released in the air.

Figure 5:
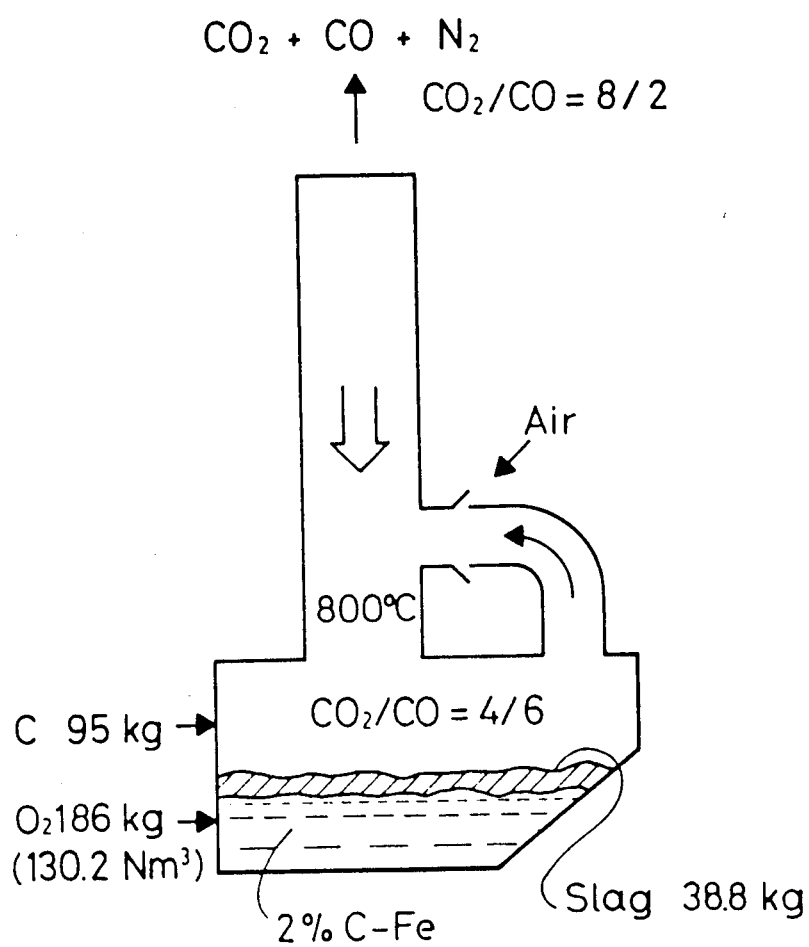
FIG. 5 is a schematic diagram showing material balance in a working example using the apparatus of FIG. 4.

A material balance of a working example of reactor iron making using the above described apparatus to produce 2 tons of iron containing C 2% is shown in FIG. 5. Heat efficiencies in this example are as follows:

(melting heat efficiency) =

$$\frac{\text{(increase of heat content in the molten iron)}}{\text{(heat generated in the reactor)}} = 0.60$$

(scrap preheating efficiency) =

$$\frac{\text{(increase of heat content in the scrap)}}{\text{(sensible heat in the exhaust gas)}} = 0.44$$

$$\text{(total heat efficiency)} = \frac{\text{(total heat recovered)}}{\text{(total heat generated)}} = 0.56$$

Figure 6:
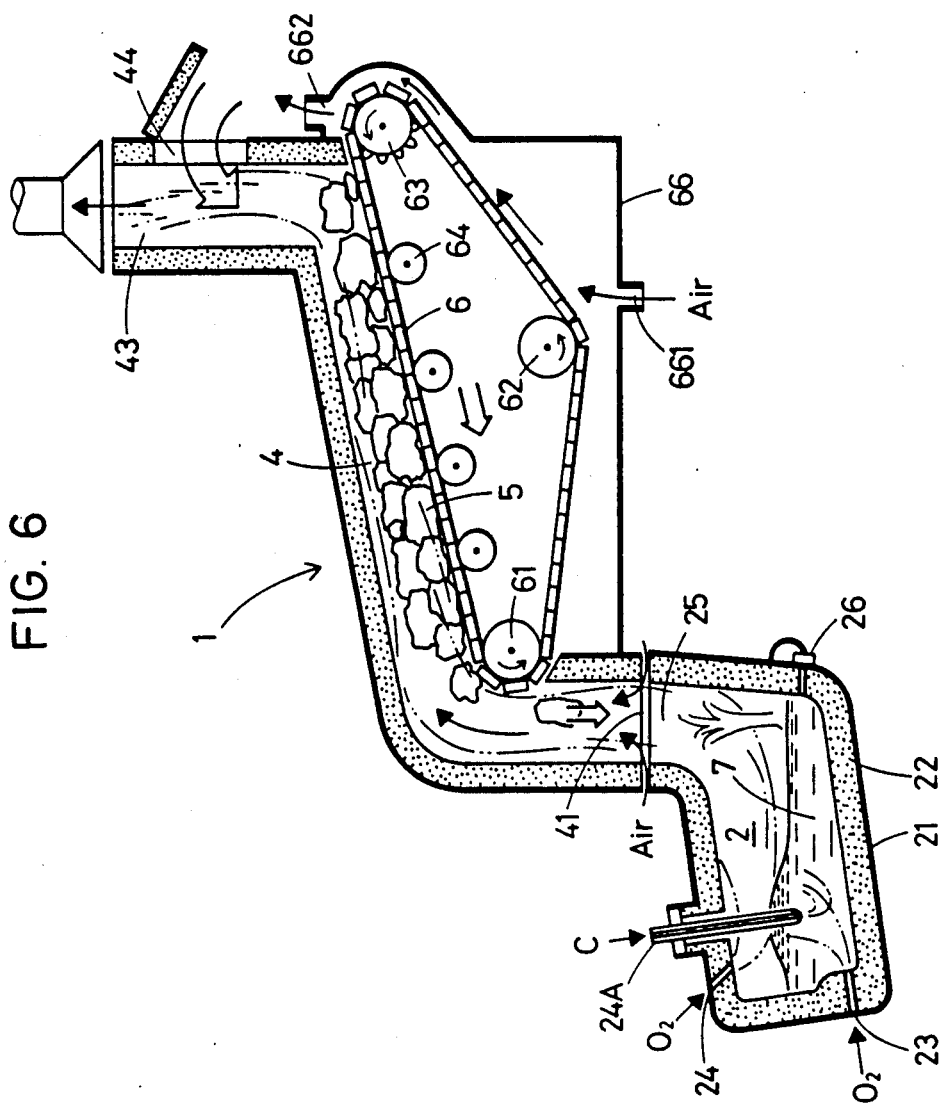
FIG. 6 is a longitudinal section of a still further embodiment of the present apparatus for reactor iron making to illustrate operation thereof.

Another embodiment of the recommendable apparatus for reactor iron making has the structure shown in FIG. 6. The apparatus essentially comprises reactor 2 with refractory lining 22 and having each at least one upper and lower gas blowing nozzle 23 and 24 and an iron scrap charging inlet 25 which is at the same time high temperature gas exit; and a fire flue 4 installed in approximately horizontal position, one end of which is connected with the high temperature gas exit 25 and inlet of iron scrap, and the other end of which is a low temperature gas exit 43 with iron scrap introducing inlet 44, the fire flue 4 having a heat resistant conveyor 6 at the lower part thereof for conveying the introduced iron scrap 5 and charging it into the reactor 2, and at the same time for heat exchange between the high temperature exhaust gas and the iron scrap.

Reactor 2 may be provided with, if necessary, a lance 24A for injecting powdery carbonaceous material with a suitable carrier gas into the molten iron. Tapping of the molten iron may be carried out through gas exit and iron scrap charging inlet 25 by tilting the reactor. However, it is preferable to use a tapping nozzle 26, because it may be desired not to interrupt the melting operation by the tapping, and heat loss will be diminished. The position of tapping nozzle 26 should be such that a suitable molten iron remains as the seed in reactor 2.

Fire flue 4 may have the structure, as shown in FIG. 6, wherein the upper part of heat resistant conveyor 6 forms the lower surface of the fire flue. The conveyor should have such a form and length that it has a horizontal or an easily inclined surface descending in the conveying direction to the degree the iron scrap 5 does not slide down, and that the high temperature exhaust gas from reactor 2 ascends on the conveyor where sufficient heat exchange between the gas and the iron scrap will be realized.

Heat resistant conveyor 6 may comprise an endless track which is held and droven by holding rolls 61 and 62 and a driving gear 63 to move in the direction shown by the arrow and supported by plural idle rolls 64,64.

This endless track should be made of a heat resistant steel. In order to minimize the damage inflicted to the track due to high temperature, it should be covered with a housing 66 in which cool air is fed through cooling air inlet 661 to cool the track. Feeding of the cold air is carried out preferably by forced ventilation. The air heated to a high temperature by cooling the track flows out of hot air outlet 662, and can be, if desired, utilized as a heat source in a heat recovery device (not shown).

Operation of the above described apparatus may be understood from the above explanation. The iron scrap 5 which is introduced through iron scrap inlet 44 and placed on heat resistant conveyor 6 moves down in the fire flue as the track moves, and fall into reactor 2. The iron scrap in the reactor melts by being heated with the heat generated by the reaction of the carbonaceous material injected into the reactor and oxygen. High temperature exhaust gas containing CO comes from exit 25 into fire flue 4. The gas is mixed with air introduced through a clearance 41 between the exit and the fire flue, and reacts to generate heat which preheats the iron scrap. The resulting low temperature gas comes out of low temperature gas exit 43, and treated in an exhaust gas treatment device (not shown) to be released in the air.

One of the particular embodiments of the present invention is "twin" reactor iron making, which aims at improvement in heat efficiency and unit material consumption as well as smoother operation. Twin reactor iron making uses, instead of the combination of single reactor and shaft, two mutually connected reactors, in one of which melting of iron scrap proceeds, and in the other iron scrap to be melted is preheated.

The present method of twin reactor iron making is characterized by the following steps:

(i) charging iron scrap and carbonaceous material in reactor A and reactor B composing the twin reactor, and if necessary, preheating them;

(ii) adding molten iron to reactor A, blowing oxygen gas beneath the molten iron surface so as to stir the molten iron and to oxidize the carbonaceous material mainly to CO, blowing oxygen gas over the molten iron surface so as to oxidize a portion of the CO gas to $CO_2$, and melting the iron scrap charged in reactor A with the heat generated through the oxidation;

(iii) introducing a high temperature exhaust gas coming out of reactor A as the melting proceeds into reactor B, further blowing oxygen gas into reactor B so as to oxidize the rest of CO gas to $CO_2$, and preheating the iron scrap and the carbonaceous material in reactor B with sensible heat of the exhaust gas the heat generated through the oxidation;

(iv) terminating oxygen gas blowing into reactor A when the melting is completed therein and temperature of the molten iron attains to a predetermined level, adding a portion of thus formed molten iron to the preheated iron scrap and the carbonaceous material in reactor B, and transferring the rest of the molten iron to refining process; and (v) charging iron scrap and carbonaceous material into reactor A again, and blowing oxygen gas into the molten iron in reactor B to commence melting of the iron scrap;

and by repeating the above steps (ii) through (v) with interchanging roles of reactor A and reactor B.

Apparatus for the above twin reactor iron making essentially comprises two reactors with refractory lining which are mutually connected at upper parts thereof with connecting tubes. The reactors have an opening and shutting gas entrance and exit and a molten iron tapping nozzle, and each at least one upper and lower gas blowing nozzle.

Figure 7:
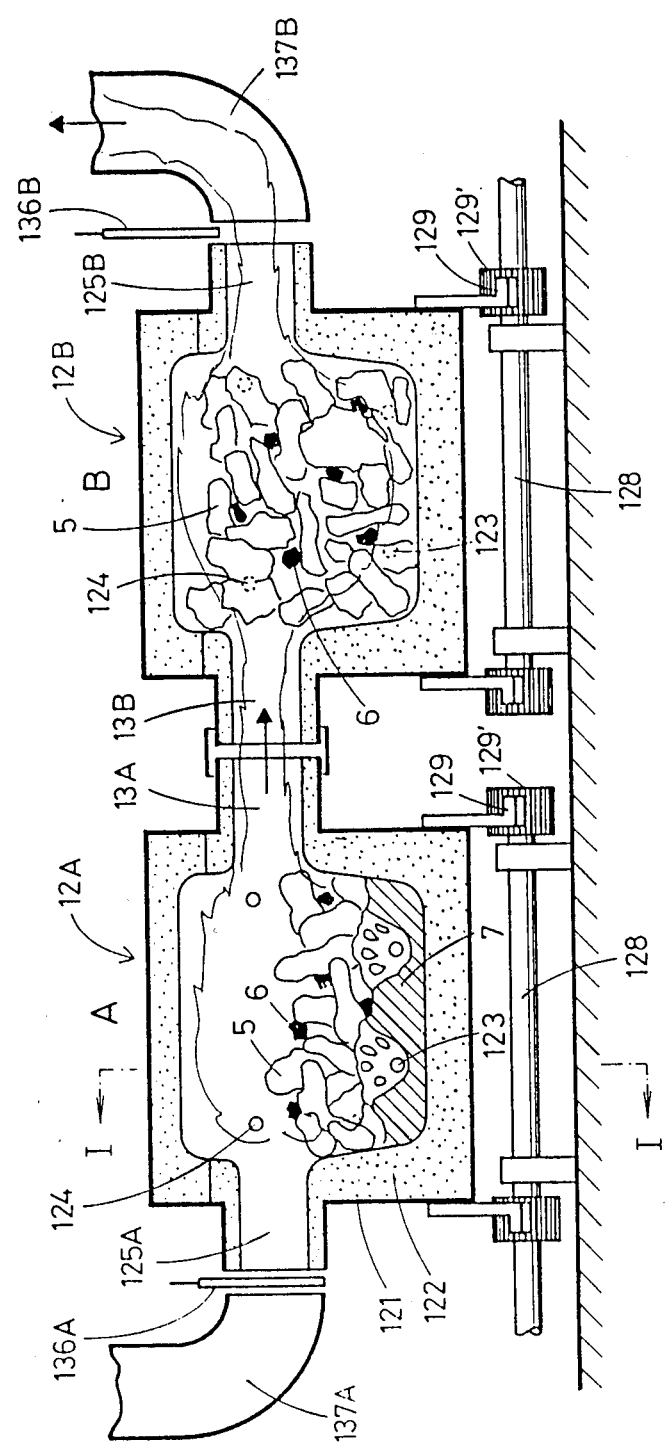
FIG. 7 and FIG. 8 illustrate operation of "twin" reactors according to the present invention.
Figure 8:
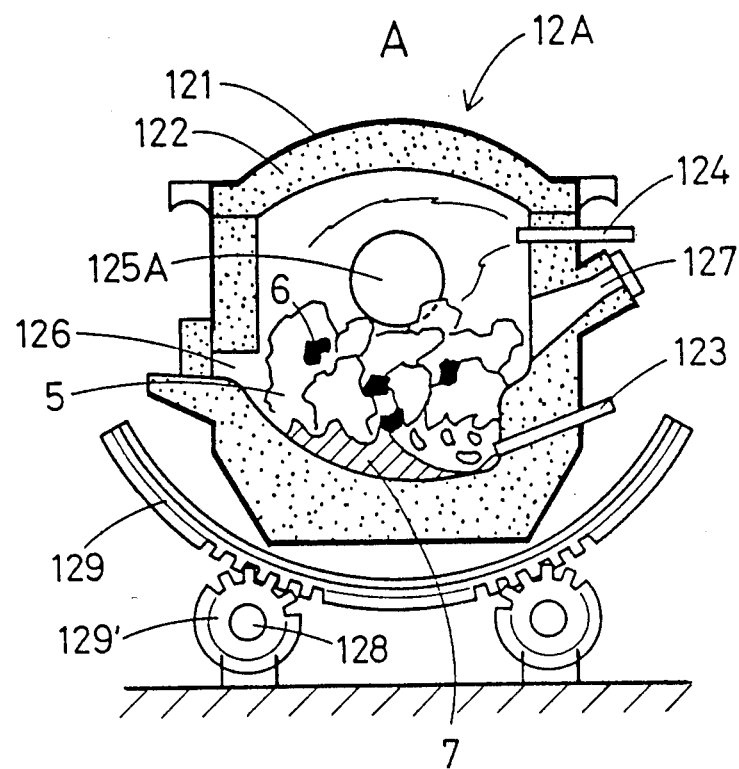

A typical embodiment of the twin reactor iron making is described below with reference to the attached drawings:

The apparatus for twin reactor iron making comprises, as shown in FIG. 7 and FIG. 8, reactor 12A comprising a box-type body and a lid both of which are made of a steel shell 121 with refractory lining 122, and reactor B having the same structure arranged symmetrically to reactor 12A. The reactors are mutually connected at connecting tubes 13A and 13B. Each reactor has a nozzle 123 in lower part thereof for blowing oxygen gas into the molten iron, and another nozzle 124 in the upper part thereof for blowing oxygen gas into the space over the molten iron. Each reactor also has a tapping nozzle 126 and a working hole 127 for charging molten iron or slag-forming agents.

Reactors A and B further have gas exits 125A and 125B at the opposite sides to connecting tubes 13A and 13B, which exits may be opened and closed by dampers 136A and 136B, and when opened, connect with exhaust duct 137. Connecting tubes 13A and 13B as well as gas exits 125A and 125B are on the same axis.

Reactors A and B are tiltable through a certain range of angles around the above mentioned axis by being supported at semi-circular gear 129 with two pinion gears 129' which are driven by a motor (not shown) by means of driving shaft 128. The above noted connecting tubes 13A and 13B are slidably connected, and therefore, the reactors can be separately tilted.

Figure 9:
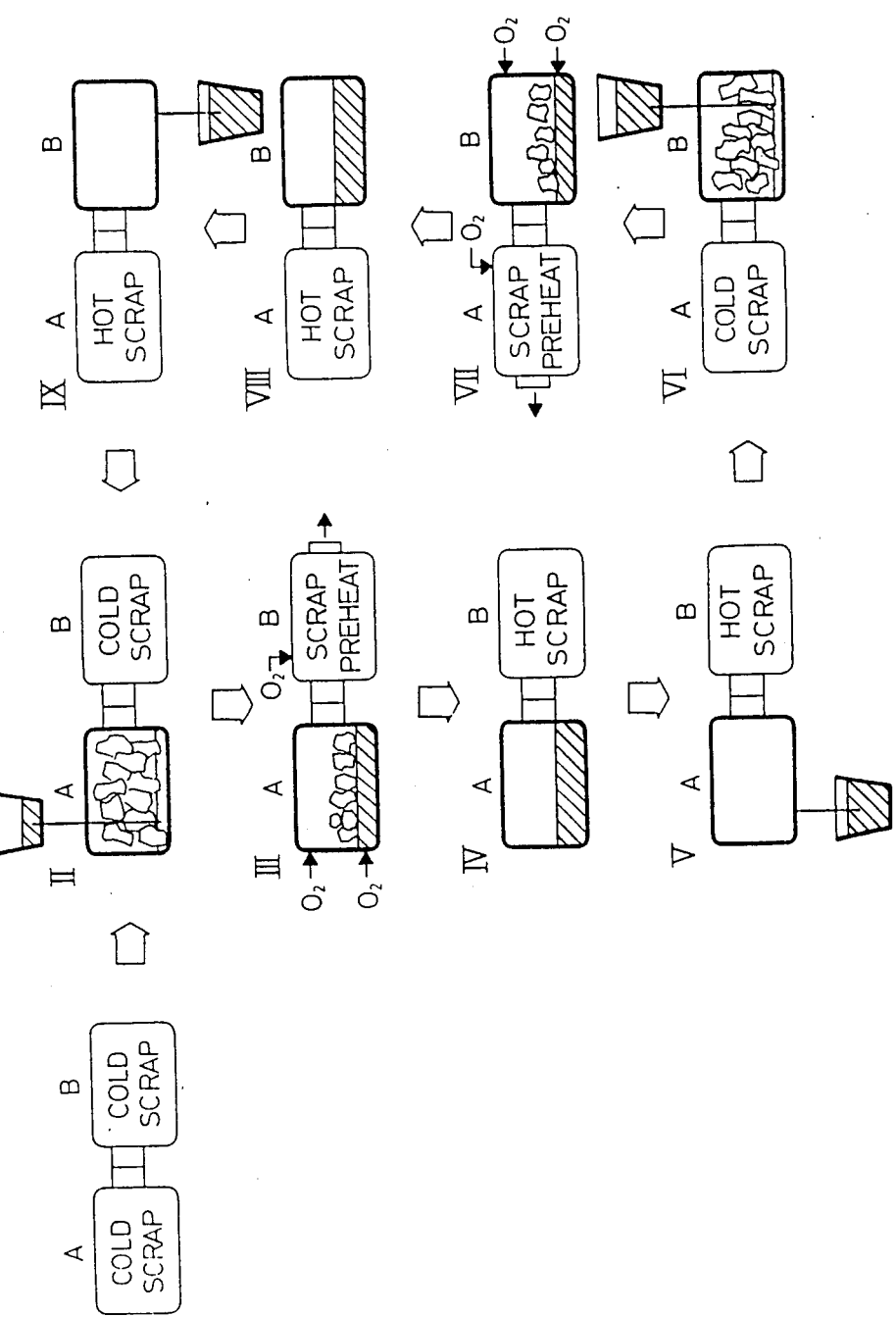
FIG. 9 illustrates the steps of the twin reactor iron making of the present invention.

At the beginning of operation, iron scrap 5 and carbonaceous material 6 are placed in both reactors A and B as shown in FIG. 9 I. When necessary, the content in one of the reactors (e.g. reactor A), or both of them, is preheated. Preheat may be realized by heating the inner wall of the reactor prior to charging.

Then, a certain amount of molten pig iron or steel prepared in another device such as a blast furnace or an arc furnace is poured into reactor A (FIG. 9 II). Blowing of oxygen gas through the upper and lower nozzles 123 and 124 causes, as described above, oxidation of the charged carbon in molten iron 7 to CO, and a portion of the resulting CO is further oxidized to $CO_2$ in the space over the molten iron. Due to the heat generated through these oxidation reactions, the charged iron scrap is melted. At the same time, carburation to the molten iron occurs and progress very rapidly because of forced stirring by the gas being blown (FIG. 9 III).

After completion of melting of the first charge of iron scrap, the second and, optionally the third or more charge of iron scrap and carbonaceous material is made, and blowing of oxygen gas is continued to increase the amount of molten iron.

When the amount of molten iron reaches to the limit of reactor capacity (FIG. 9 IV), blowing of oxygen is terminated, and reactor A is tilted for tapping the molten iron through the opened tapping nozzle into a ladle (FIG. 9 V). For the purpose of efficient operation, it was experience that the amount of the molten iron should be at maximum 40% of the inner volume of the reactor, in other words, 60% or more of the reactor volume should remain as the space.

During progress of melting of the iron scrap in reactor A, high temperature exhaust gas occurring therefrom is introduced into reactor B through connecting tubes 13A and 13B. Oxygen gas is blown also in reactor B to oxidize a major amount of CO remaining in the exhaust gas to $CO_2$. Sensible heat of the exhaust gas and the heat generated by the oxidation brings the iron scrap and the carbonaceous material placed in reactor B to a high temperature. The exhaust gas finally enters in exhaust duct 137B through gas exit 125B with opened damper 136B, and passes to an exhaust gas treating apparatus (not shown in the Figures).

A portion of the molten iron tapped from reactor A is poured as seed molten iron into reactor B containing the iron scrap and the carbonaceous material which were preheated as described above, and the rest of the tapped molten iron is subjected to refining. It is preferable to have the amount of the seed molten iron transferred be, depending on reactor capacity and operation conditions, about 5 to 80% of the maximum amount of the molten iron.

Then, reactor A receives again charge of iron scrap and carbonaceous material (FIG. 9 VI).

Damper 136B is closed and damper 136A is opened to enable blowing oxygen gas into reactor B so as to melt the iron scrap charged therein, and at the same time, the exhaust gas from reactor B is utilized for preheating the iron scrap of the second charges in reactor A (FIG. 9 VII). After completion of melting in reactor B (FIG. 9 VIII), the molten iron is tapped therefrom as described above (FIG. 9 IX).

Thus, iron making will be continued using the twin reactors by interchanging the roles of reactors A and B.

The present reactor iron making technology has the following advantages over the cupola iron making which is a typical technology of iron making using neither electric power nor petroleum:

Firstly, the present technology does not require lump coke as the heat source for melting, and therefore, it is free from limitation by the material. Secondly, the heat generated by C-CO can be efficiently absorbed by the molten iron, and further, a major portion of CO is burned to $CO_2$ to generate a large quantity of heat. This heat readily transfers to the molten iron because of increased free surface thereof given by stirring with the gas blown into the reactor, and also contributes to elevating temperature of the iron scrap in the reactor in which preheating is carried out.

The above cumulative merits can be proved by the ratio of consumed carbonaceous material to a unit of molten iron produced. In the example shown below, the ratio recorded is about 13% (based on pure carbon), which is better than the typical value in cupola iron making of 2-ton scale, about 16%. Because a cheaper heat source of lesser amount is consumed, it is evident that the present technology can enjoy iron making with greatly reduced costs.

This technology also has an advantage of simultaneous melting and oxidation refining and, if desired, further refining, which cannot be realized in cupola iron making.

Various types of the present apparatus for reactor iron making are so constructed to make the most of the above described method of reactor iron making. Contrary to cupola iron making in which the size and mechanical strength of coke are critical for stable operation, the present apparatus does not use the carbonaceous material as a part of the furnace, and therefore, stable operation can be readily continued regardless of the kinds and the shape of the carbonaceous material. Effective stirring of the molten iron due to the gas blowing thereinto and utilization of heat of burning $CO-CO_2$ in the space of the upper part of the reactor contribute to the rapid melting and carburization. Accordingly, the apparatus will exhibit a higher productivity in pig iron making than a cupola.

The stucture of combining separate reactor and shaft is convenient from the viewpoint of construction, maintenance, particularly working refractory material, and operation. For example, the reactor could be used as a vessel for conveying molten iron instead of a ladle.

In the apparatus having the shaft which is provided with the by-pass tube, the lower part of the shaft can be opened and closed for controlling of charging the iron scrap, and the amount of the iron scrap may be controlled as intended by varying time interval of operating the stopper and the damper.

Also in the apparatus using the heat resistant conveyor for conveying the iron scrap, the amount of charging iron scrap may be controlled as intended by choosing moving speed of the endless track.

Thus, even if the shape and size of the iron scrap varies, a determined amount can be charged, and hence, stable operation can be maintained.

Also in the present twin reactor iron making, it is advantageous that the iron making suffer little from limitation by the material used, the iron scrap and the carbonaceous material. This is because, in the twin reactor technology, the lid of the reactor is removed for direct charging.

EXAMPLE 1

A reactor of the structure as shown in FIGS. 1 and 2 and capacity 1.57 $m^3$ was constructed. Because the scheduled filling rate is at maximum 40% of the capacity, this reactor can contain 4.40 tons of molten iron (calculated on the density of 7.0 $g/cm^3$). The shaft connected to the reactor is a cylinder of inner diameter 0.5 m and height 3.5 m.

The inner wall of the reactor was preheated with a gas burner, and the reactor received 1600 kg of pig iron prepared in an arc furnace. Temperature of the molten pig iron decreased from 1450° C. to 1400° C.

For the first 15 minutes, there were charged coal at the rate of 2.0 kg/min. (in terms of carbon) and iron scrap at the rate of 15 kg/min. Also, oxygen was blown through the upper and the lower nozzles of the reactor in an amount 2.43 $Nm^3$/min. The above amount of carbon was decided with the intention of maintaining a carburation rate of 2.5%.

Melting of the iron scrap was observed. For the subsequent 15 minutes charging was made with increased rates, 2.5 kg/min. of the coal, 17 kg/min. of the iron scrap, and 3.11 $Nm^3$/min. of oxygen to continue melting.

When 105 minutes elapsed over seven steps of the operation, the amount of the molten pig iron attained to the predetermined limit, 4.40 tons. 2.8 tons of the molten pig iron was tapped, and 1.6 tons of the pig iron, the same amount of the initial seed molten iron remained in the reactor.

The same stepwise operation cycles were repeated. Data on the typical operation cycle are shown in FIG. 3A through 3G.

EXAMPLE 2

A twin reactor having the structure shown in FIGS. 7 and 8 was prepared. The scheduled filling rate of this reactor is also a maximum of 40% of the capacity, and thus, the reactor may contain 1.20 tons of molten iron.

The inside of both reactors A and B preheated with a gas burner.

Each 700 kg of iron scrap was placed in each of the reactors.

200 kg of molten pig iron (C: 2%, temperature: 1450° C.) prepared in an arc furnace was added to the iron scrap in reactor A, and 8.2 kg of CaO was charged as a slag forming agent.

In the first 20 minutes, coal powder (in terms of carbon) was injected at the rate of 0.36 kg/min., while oxygen gas was blown at the rate of 0.40 $Nm^3$/min. in reactor A. In reactor B, oxygen was blown at the rate of 0.11 $Nm^3$/min.

Figure 10:
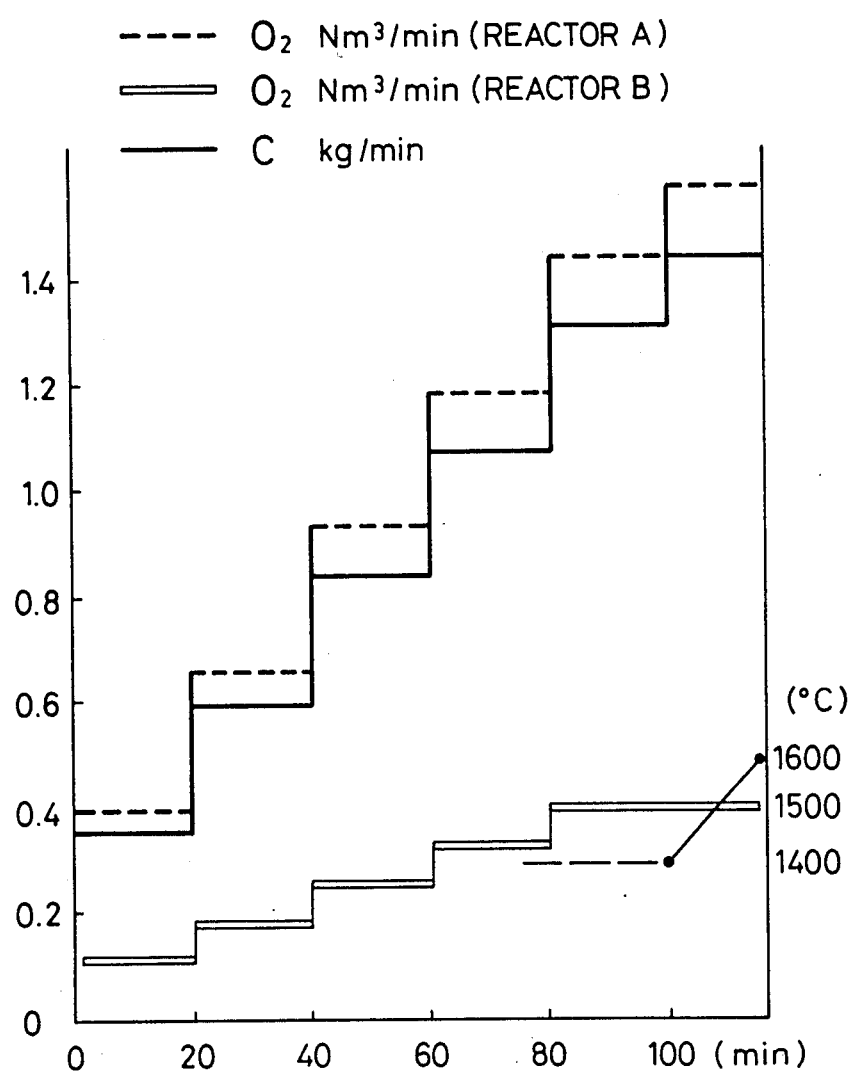
FIG. 10 illustrates the pattern according to the present twin reactor iron making, which is a graph showing change in amount of oxygen gas blown into the reactor, amount of charging coal, and temperature of the molten pig iron, during one cycle of the operation.

As melting of the scrap proceeded, the amounts of coal and oxygen injected and blown in reactor A and the amount of oxygen blown into reactor B were increased according to the pattern shown in FIG. 10, and thus, six steps of injection and blowing were made. During the above operation, melting of the charged iron scrap was observed, and an additional 300 kg of iron scrap was charged. 117 minutes after the beginning of the injection and blowing, the entire amount of iron scrap melted.

The materials consumed to obtain 1200 kg of molten pig iron of 1600° C. were:
total carbon:

108.5 kg (in addition to this 14.9 kg of ash was formed)

total oxygen:
152.6 Nm$^3$
into reactor A: 119.6 Nm$^3$
into reactor B: 33.0 Nm$^3$ The ratio $CO/CO_2$ was 6/4 in reactor A, and 2/8 in reactor B.

1000 kg of molten pig iron out of the 1200 kg obtained was subjected to refining, and the rest, 200 kg was poured as the seed on the preheated iron scrap in reactor B. Reactor A received a charge of cold scrap again, and melting operation was continued with interchanged roles of reactors A and B.

We claim:

1. An apparatus for reactor iron making comprising
   a reactor having an upper part, a lower part, a top part connected to said upper part, and a refractory lining in said upper part and said lower part;
   at least one upper gas blowing nozzle means in said upper part of said reactor for blowing gas onto molten iron in said refractor when molten iron is present in said reactor;
   at least one lower gas blowing nozzle means in said lower part of the reactor for blowing gas directly into molten iron in said reactor when molten iron is present in said reactor,
   iron scrap charging inlet means formed in said top part of said reactor for directly charging iron scrap into said reactor,
   a vertical shaft installed directly above said inlet means and connected therewith, said vertical shaft having an upper end, a lower end, a low temperature gas exit at said upper end and an iron scrap entrance at said upper end,
   means installed in said lower end for controlling charging of the iron scrap to said reactor,
   said vertical shaft having a gas inlet positioned directly above said means for controlling charging,
   by-pass tube means connected between said top part of the reactor and said gas inlet for permitting exit of high temperature exhaust gases from said reactor and introducing said exhaust gases and iron scrap therein to be charged, and
   means in said by-pass tube means for introducing oxygen gas or air into the high temperature exhaust gases to react therewith and generate further heat.

2. An apparatus as claimed in claim 1, wherein said means for controlling comprises a damper positioned immediately above said inlet means and movable to close and open said vertical shaft and a stopper positioned above said damper and movable to open and close said vertical shaft, whereby certain amounts of iron scrap can be charged to said reactor by sequential openings and closings of the said damper and said stopper.

3. An apparatus as claimed in claim 1, wherein said means for introducing oxygen gas or air comprises nozzle means formed in said by-pass tube means.

* * * * *